(12) United States Patent
Spires et al.

(10) Patent No.: US 6,516,745 B1
(45) Date of Patent: Feb. 11, 2003

(54) PET TRAVELING KIT

(76) Inventors: Donna K Spires, 914 Old Orangeburg Rd., Lexington, SC (US) 29073; Margie S Spires, 914 Old Orangeburg Rd., Lexington, SC (US) 29073

( * ) Notice: Subject to any disclaimer, the term of this patent is extended or adjusted under 35 U.S.C. 154(b) by 0 days.

(21) Appl. No.: 09/911,680

(22) Filed: Jul. 24, 2001

(51) Int. Cl.[7] ............ A01K 29/00; A01K 1/00
(52) U.S. Cl. ............ 119/28.5; 119/497
(58) Field of Search ............ 119/28.5, 165, 119/497, 498; 5/416; 493/935, 243; 280/47.38; 220/4.22, 9.1, 9.2

(56) References Cited

U.S. PATENT DOCUMENTS

| | | | | |
|---|---|---|---|---|
| 2,612,200 A | * | 9/1952 | June | 220/4.22 |
| 3,156,213 A | * | 11/1964 | Patten | 220/9.2 |
| D294,752 S | * | 3/1988 | Palier | 119/28.5 |
| 5,490,478 A | * | 2/1996 | Cole | 119/28.5 |
| 5,515,811 A | * | 5/1996 | McAlister | 119/28.5 |
| 5,603,573 A | * | 2/1997 | Mercier et al. | 119/497 |
| 5,755,180 A | * | 5/1998 | Smith | 119/165 |
| 5,926,881 A | * | 7/1999 | Madison | 5/416 |
| 6,267,078 B1 | * | 7/2001 | Pina | 119/165 |

* cited by examiner

Primary Examiner—Charles T. Jordan
Assistant Examiner—Elizabeth Shaw
(74) Attorney, Agent, or Firm—Michael A. Mann; William Y. Klett; Nexsen Pruet Jacobs & Pollard LLC

(57) ABSTRACT

A pet traveling kit which integrates a pet bed with a food and water storage system for use in traveling with a pet. Generally resembling a folding garment bag, the portable pet kit of includes a folding shell which carries a cushion for use by the pet to sleep or lounge, and a mesh pocket for use in transporting items a pet may need such as medicine or pet toys. At the fold of the shell are sealable containers adapted to hold food and water releasibly affixed to a spine, which also provides support to the fabric shell. The fabric shell further includes handles or straps and closure for convenient carrying.

18 Claims, 5 Drawing Sheets

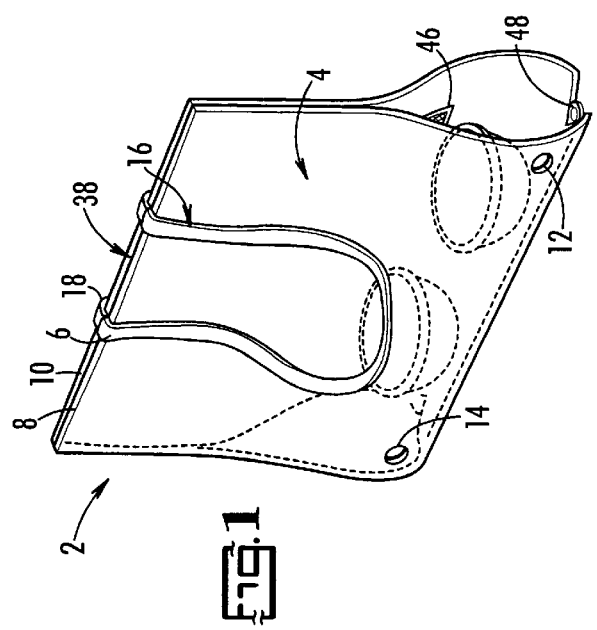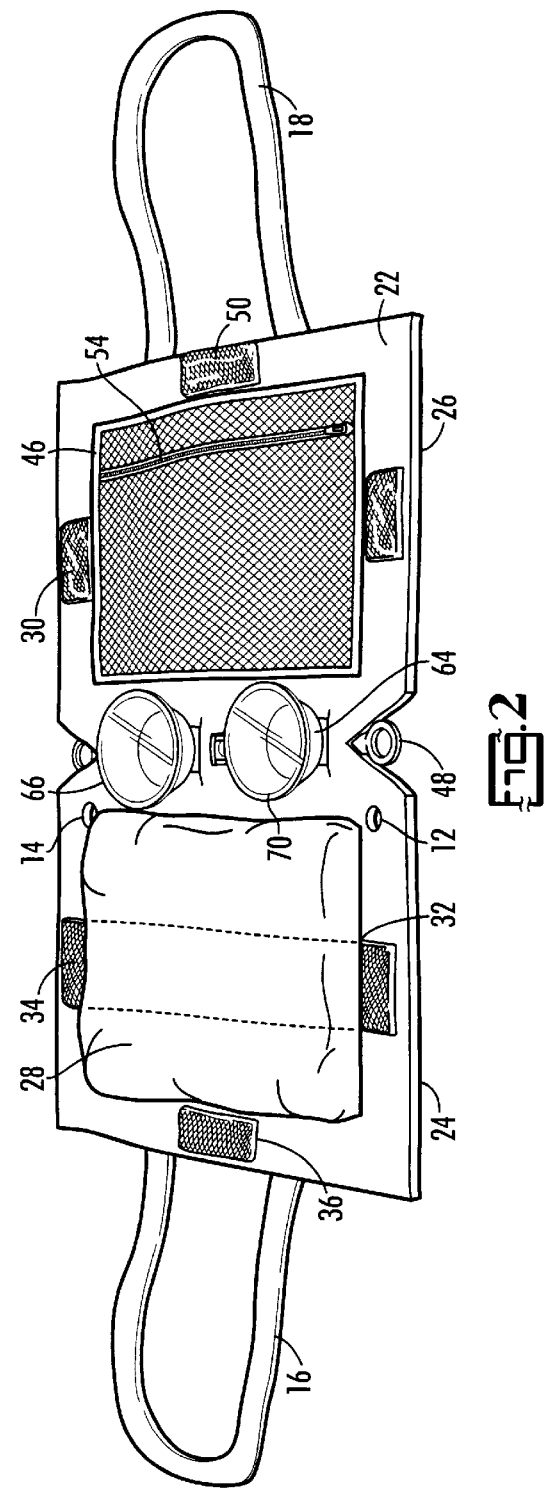

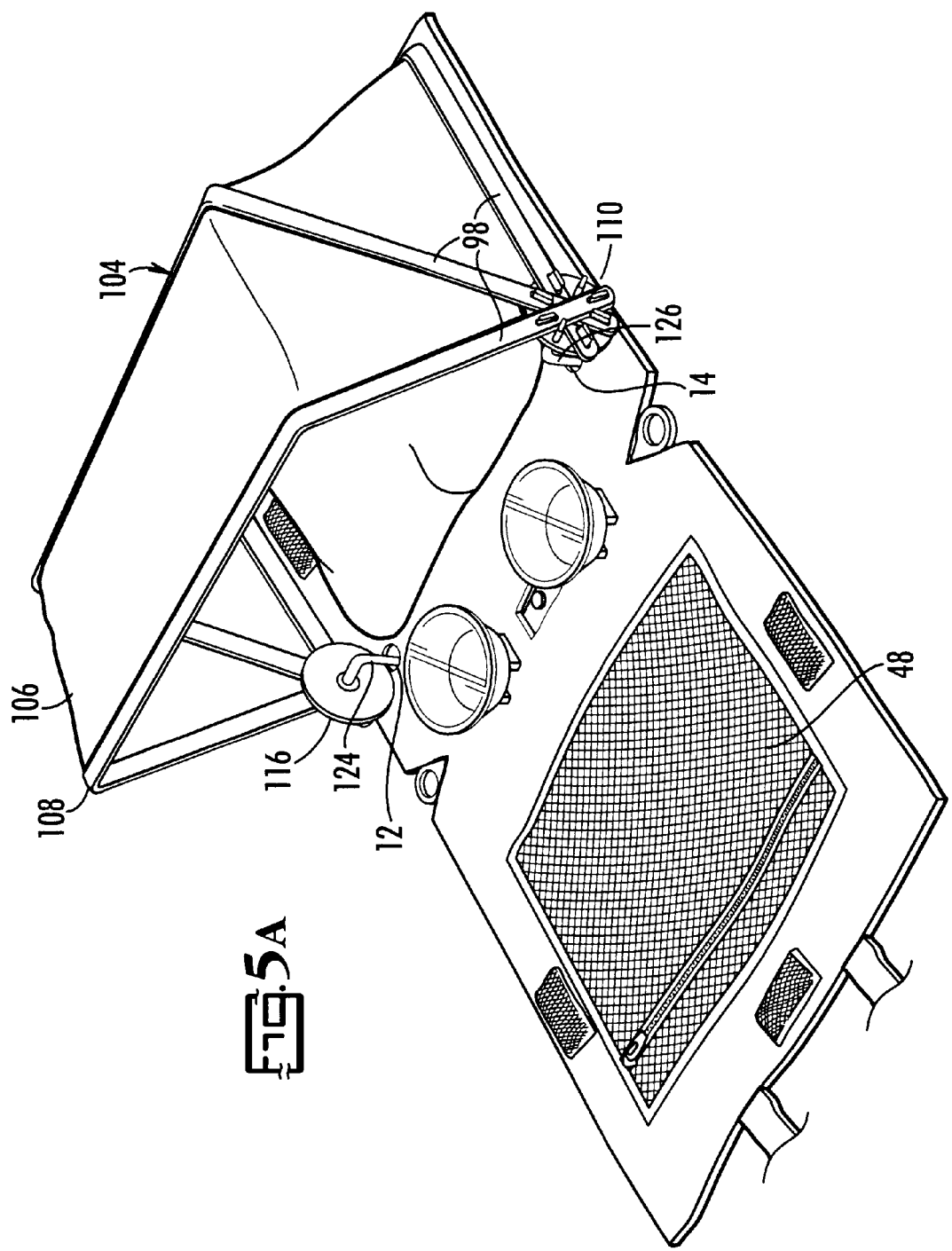

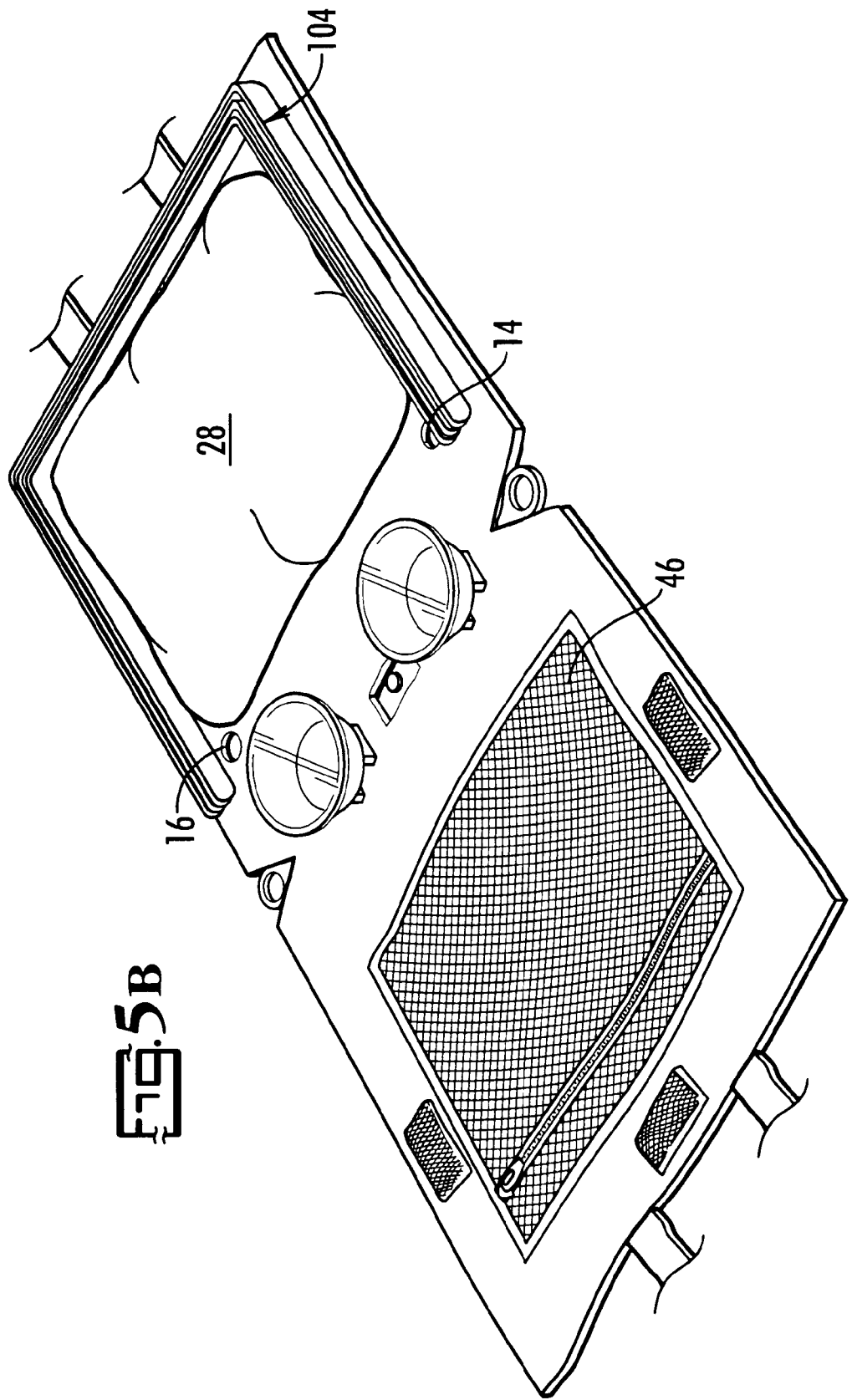

PET TRAVELING KIT

FIELD OF THE INVENTION

The present invention relates to portable pet beds and more particularly to an integrated pet travel bed and food storage and serving system.

BACKGROUND OF THE INVENTION

Typically, portable pet beds include a cushion or bedding and handles or carry straps.

The major disadvantage of the currently available pet beds is that travelers wishing to take pets with them must carry food, water, and other accessories separately from the pet beds.

Currently available pet beds do not fully meet the needs of a pet once the traveler has reached his or her destination. For example, when pets are taken to an outside destination, they frequently require shade. Because the typical portable beds include only a cushion that lays flat, a pet may become dehydrated or overheated.

Further, a pet will probably need food and water during a trip. Typical portable pet beds or pet carriers do not include containers for food and water. Even when these containers are present, they are not rigidly affixed to the carrying article. Therefore, the containers may be displaced from the article. Also, the contents of the containers may be easily spilled by the pet while eating or drinking if the containers are not pinned down.

There exists a need for an portable pet bed that is more better suited for travel and that includes all of a pet's necessities in an organized kit so as to accommodate the pet to various surroundings, and to reduce a traveler's packing inconvenience.

SUMMARY OF THE INVENTION

According to its major aspects and broadly stated, the present invention is an integrated pet bed having a food and water storage system for use in traveling with a pet. The present invention is not a pet carrier, but instead it carries the items a pet might need during a trip.

Generally, the present invention resembles a piece of luggage. In particular, the present invention resembles a folding garment bag. When opened, it displays various contents and compartments.

The portable pet kit of the present invention includes a folding fabric shell having two halves. One half of the fabric shell includes a cushion for use by the pet to sleep or lounge. The second half of the fabric shell includes a mesh bag for use in carrying items a pet may need such as medicine or pet toys. At the fold of the fabric shell are sealable containers adapted to hold food and water rigidly affixed to a key bar, which also provides support to the fabric shell. The fabric shell further includes handles or straps and a closure for convenient carrying.

The sealable containers are attached to a rigid member at the base of the containers which has a slot formed therein through which the key bar is inserted. The key bar is threaded through the fabric shell and includes a spring loaded detent for attaching and releasing the rigid member to the key bar. In addition to providing means for attaching the sealable containers, the key bar also provides support and rigidity to the fabric body.

In an alternative preferred embodiment of the present invention, a pet hood is added. The attachment generally resembles the canopy covers seen on typical baby carriages. The hood is preferably openable to different extents to provide various amounts of shade depending on the needs of the pet. The hood includes a fabric cover attached to frame members, rotationally affixed to each other and supported by a gear mechanism. The hood is placed through apertures in the fabric shell and preferably provides shading over the cushion.

A major feature of the invention is the portable fabric shell. The fabric shell is capable of carrying all of a pet's necessities in one place. The shell includes a bed, sealable containers for food and water, a pocket or container means for carrying pet toys and/or pet medication.

Another important feature of the invention is the attaching means for the sealable containers. This attaching means prevents the containers from falling out of the fabric shell and being misplaced during travel. Further, the attachment of the containers to the fabric shell allows the pets to eat or drink without their containers moving and potentially spilling their contents. The fixture of the containers will also reduce the amount of cleaning to be done on the part of the pet owner.

Still another important feature of the invention is the hood of the alternative preferred embodiment. This hood provides a shade for the pet that has to be outside and exposed to the sun or rain. Not only will a pet with be more comfortable, but the hood will help to avoid dehydration of a pet.

Yet another important feature of the invention that the portable pet kit can be folded flat or compressed during storage or traveling. This feature provides added convenience to the traveler, particularly if a large amount of luggage is being taken on the trip.

Other features and advantages will become apparent to those skilled in the art from a careful reading of the Detailed Description of Preferred Embodiment accompanied by the following drawings.

BRIEF DESCRIPTION OF THE DRAWINGS

A more complete understanding of the invention may be had by reference to the following detailed description when taken in conjunction with the accompanying drawings:

FIG. 1 is a perspective view of the pet traveling kit taken from one end thereof showing that the pet traveling kit in its fully closed configuration, according to a preferred embodiment of the present invention;

FIG. 2 is a perspective view of the pet traveling kit of FIG. 1 showing the pet kit in its fully opened configuration;

FIG. 5A is a perspective view of the alternative preferred embodiment of the traveling pet kit of FIG. 1 shown with a hood, according to a preferred embodiment of the present invention;

FIG. 5B is a perspective view of the alternative preferred embodiment of the traveling pet kit of FIG. 1 shown with a hood in a collapsed, flattened configuration, according to a preferred embodiment of the present invention;

DETAILED DESCRIPTION OF PREFERRED EMBODIMENTS

Figure 3:
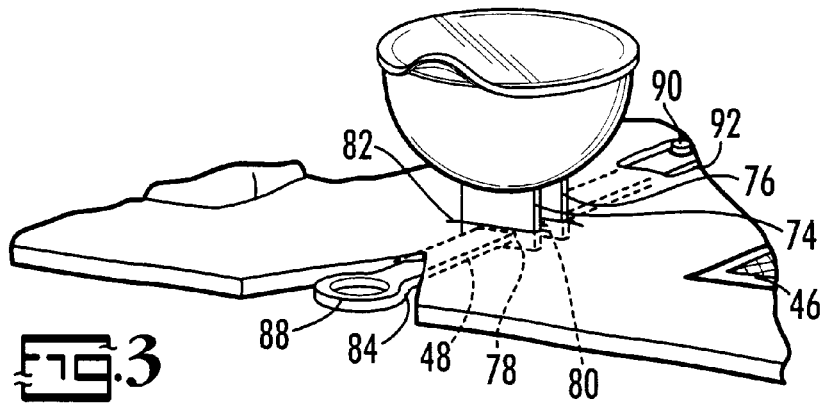
FIG. 3 is a detailed perspective view showing the attaching means of the sealable container through which the key bar is threaded.

Referring specifically to the drawings, the portable pet kit will be disclosed.

FIG. 1 shows a portable pet kit 2 in accordance with the present invention, in a fully closed configuration. As was noted above, it is a particular feature of the present invention that portable pet kit 2 can be folded in a relatively flat configuration for convenient storing and traveling. As shown, pet kit 2 includes a shell 4 which may be made of any desired material such as any type of cloth or woven material that can be easily compressed. Portable pet kit 2 may be provided with a conventional handle 16 comprising opposed handle portions or straps 6 and 18 secured to opposing top edges 8 and 10 of pet kit 2. During travel, one may carry pet kit 2 by hand or over the shoulder using straps 6 and 18. Straps 6 and 18 facilitate the carrying of pet kit 2, however, pet kit 2 may also be transported by simply grabbing on to top edges 8 and 10. Portable pet kit 2 is closed using a releasible means 38 which may be made of any desired fastener.

FIG. 2 shows portable pet kit 2 in a fully opened configuration ready for use by pet and comprising an inner surface 22 having various contents. As shown, inner surface 22 of shell 4 includes a first half 24 and a second half 26. A cushion 28 which may be made using various shapes, sizes, and materials is attached by a releasible fastening means 34 to first half 24 of inner surface 22. Preferably, releasible fastening means 34 is located at base 32 of cushion 28 and may be made of any desired fastener including a hook and loop fastener. As releasible closing means 38 for shell 4, inner surface 22 of shell 4 includes a loop fastener 36 located in first half 24 of shell 4 that connects with a hook fastener 50 of second half 26 of shell 4.

As discussed above, a major advantage of the present invention over the prior art is that all of the items a pet may need are easily storable in pet traveling kit 2. Therefore, one traveling with a pet need not take separate bags or containers in addition to pet kit 2. Such storage is at least partially achieved by a pocket 46 located on inner surface 22 of second half 26. Pocket 46, which is normally secured in a closed configuration by a closure 54, is attached to inner surface 22 by releasible fastening means 30. Any number of closures may be used for pocket 46, including zippers, rib and groove fasteners, buttons, drawstring closures, hook and loop fasteners, and overlapping panels. Although pocket 46 may be made of any desired material, the use of a meshed or netted material is preferred, as shown in FIG. 2. The mesh material is advantageous because it allows the pet owners to see all of the pet items. Therefore, the contents of the pocket 46 need not be emptied to locate a specific item.

As illustrated in FIG. 2, another major advantage of the present invention is a container 64 which is releasibly attached to a spine 48 of shell 4. This feature not only prevents the misplacement of container 64, but it also reduces the potential for a pet to knock over container 64 and spill its contents while eating or drinking. Further, container 64 includes a press fit lid 70 which secures the contents of container 64 during travel. The preferred embodiment shows a second container 66 which enables the simultaneous carrying of food and water.

FIG. 3 illustrates the mechanism by which container 64 is releasibly affixed to spine 48 of shell 4. This feature of the present invention has the dual purpose of providing a means for releasibly affixing container 64 to shell 4, and also adding support and rigidity to shell 4. As shown, container 64 is seated in an upright position and includes a first and second rigid base member 74 and 76 having corresponding slots 78 and 80. Although the preferred embodiment shows two rigid base members 74 and 76, only one is sufficient to affix container 64 to spine 48 of shell 4. Spine 48 includes an interior bar 92 and an exterior bar 84 dimensioned to fit into slots 78 and 80 of base members 74 and 76 of container 64. As shown, affixation of container 64 to spine 48 is achieved by inserting base members 74 and 76 through slit openings 82. Next, exterior bar 84 is threaded through shell 4 between first half 24 and second half 26 and into slots 78 and 80 of container 64. Finally, exterior bar 84 is releasibly attached to a detent 90 located within interior bar 92. As further shown in FIG. 3, exterior bar 84 includes a ring 88. The purpose of ring 88 is to facilitate exterior bar's 84 insertion into and release from shell 4; however, it is not necessary to the function of exterior bar 84.

Figure 4A:
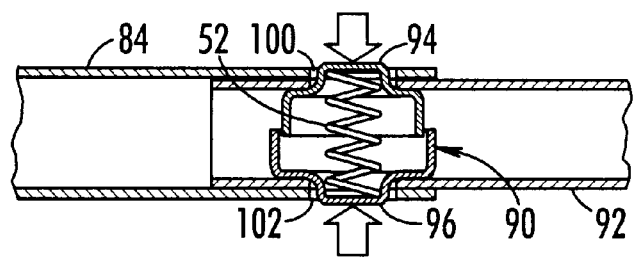
FIG. 4A is a greatly enlarged partial sectional view of the key bar attached by a spring loaded detent.
Figure 4B:
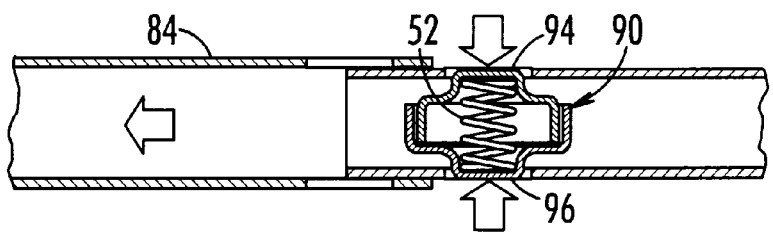
FIG. 4B is a greatly enlarged partial sectional view of the key bar released from the spring loaded detent.

FIG. 4A and FIG. 4B show an enlarged view how exterior bar 84 is attached to and released from shell 4. As shown, exterior bar 84 telescopically fits over interior bar 92. Once exterior bar 84 is threaded through shell 4 and into base members 74 and 76 of container 64, it slides over interior bar 92 and is releasibly affixed to shell 4 by detent 90 contained in interior bar 92. As shown, detent 90 comprises a spring 52, and a top member 94 which telescopically fits within a bottom member 96. Top member 94 and bottom member 96 serve as buttons for the release of exterior bar 84. When detent 90 is in locked position, spring 52 is expanded and top 94 member and bottom member 96 are exposed through apertures 100 and 102 of interior and exterior key bars 92 and 84.

The release of exterior key bar 84 is shown in FIG. 4B. Once top member 94 and bottom member 96 of detent 90 are pushed into each other, spring 52 contracts allowing for exterior bar 84 to be released. This releasing capability is important because container 64 may be more effectively laundered if removed from shell 4.

FIG. 5A and FIG. 5B show portable pet kit 2 in accordance with an alternative preferred embodiment of the present invention, this being particularly suited for situations in which a pet will be exposed to sun or rain. In the alternative preferred embodiment, pet kit 2 includes a hood 104 resembling the canopy of a baby carriage. As previously discussed, it is a particular feature of the present invention to provide a way to prevent the dehydration of a pet that must be outside for an extended period of time. As shown, hood 104 is in a fully opened configuration and includes a cover 106, which can be made of any desired fabric or material. Cover 106 of hood 104 is supported by and attached to a frame 108, comprising plural frame members 98, which are rotationally attached and supported by a gear means 110. Gear means 110 includes a first and a second gear 116 and 126 which spread out frame 108 to different extents and releasibly attach hood 104 to apertures 12 and 14 of shell 4. As shown, hood 104 is anchored to shell 4 by a post 124 that is affixed to both first and second gear 116 and 126. Post 124 is dimensioned to fit into apertures 12 and 14. In FIG. 5A, frame 108 includes three frame members; however, hood 104 may also be made of more or less depending on the amount of support needed by the given material and the amount of shade desired. As illustrated in FIG. 5B, hood 104 is collapsible and may be folded flat. This feature provides for the convenient storing and carrying of hood 104 by shell 4.

Figure 6A:
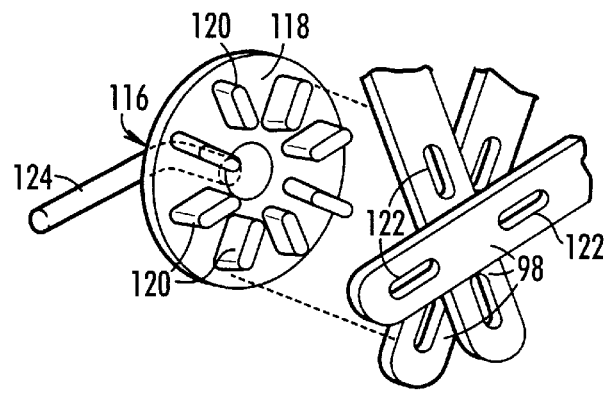
FIG. 6A is greatly enlarged partial sectional view of the gear mechanism and the rotationally attached frame members.
Figure 6B:
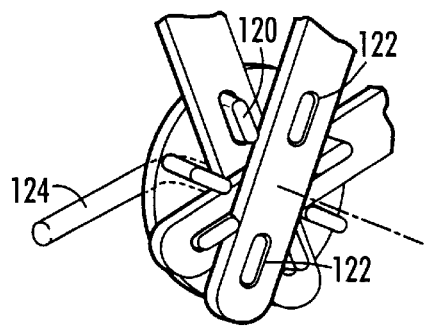
FIG. 6B is a greatly enlarged partial sectional view of the gear mechanism of FIG. 6A attached to the frame members.
Figure 6C:
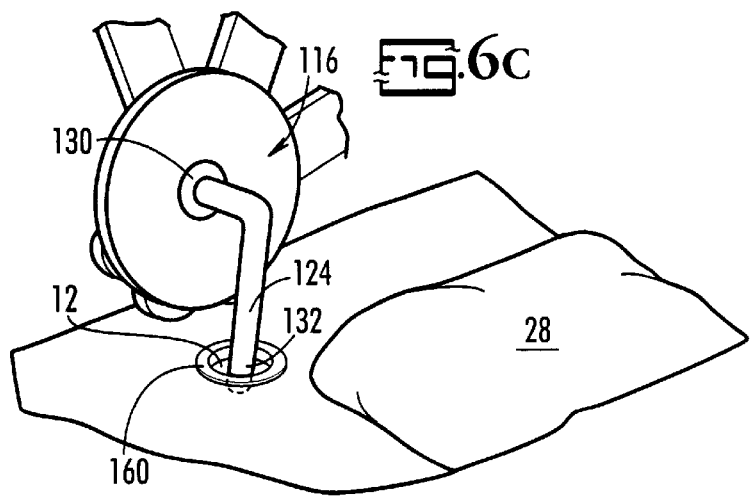
FIG. 6C is a greatly enlarged partial sectional view of the turning means of the gear mechanism of FIG. 6A.

In FIG. 6A, FIG. 6B, and FIG. 6C, gear means 110 from one side of shell 4 is shown. This feature is important because it enables hood 104 to be releasibly affixed to shell 4 and to be opened to different extents providing various amounts of shade. Gear means 110 comprises gear 116 having a rigid member 118, plural teeth 120 extruding from rigid member 118, and post 124. As shown, plural teeth 120 are evenly spaced. FIG. 6A particularly shows how gear 116 is inserted into frame 108 of hood 104. Each member of plural frame members 98 includes slots 122 dimensioned to receive a tooth of plural teeth 120 of gear 116. As shown, a tooth of plural teeth 120 of gear 116 is inserted into slots 122 of each frame member of plural frame members 98.

FIG. 6B shows the method by which gear 116 spreads out frame 108. As shown, slots 122 of each frame member of plural frame members 98 receives a tooth of plural teeth 120. Hood 104 may also be opened to different extents. By pushing in frame 108, it is released from gear 116. Once each tooth of plural teeth 120 is disengaged from slots 122 of frame 108, frame 108 may be realigned, opened to different extents, and then reattached to gear 116. This flexibility allows for various forms of shading for a pet. Depending on the environment conditions a pet may need more or less shade.

Finally, FIG. 6C illustrates post 124 of gear means 110. This feature is significant because post 124 is the method by which gear means 110 releasibly attaches hood 104 to shell 4. Post 124 includes a first end 130 that is rigidly affixed to gear 116 and opposing end 132 which is dimensioned to fit aperture 12 of shell 4. As shown, aperture 12 includes a grommet 160 which maintains aperture 12 at a dimension capable of receiving post 124. Grommet 160 further provides support for post 124.

What is claimed is:

1. An apparatus comprising:
    a shell;
    a container including base members with slots formed therein;
    a spine carried by the shell, the shell foldable along the spine; and
    means for releasibly attaching the container to the spine of the shell.

2. The apparatus of claim 1, further comprising a cushion carried by the shell.

3. The apparatus of claim 1, further comprising a pocket carried by the shell.

4. The apparatus of claim 1, wherein the spine is dimensioned to fit into the slots of the base members of the container.

5. The apparatus of claim 1, wherein the means for releasibly attaching the container to the spine includes a detent so that when the detent is pressed, the container can be removed from the shell.

6. An apparatus comprising:
    a shell;
    a cushion carried by the shell;
    a pocket carried by the shell;
    a container, the container including base members with slots formed therein;
    a spine dimensioned to fit into the slots of the base members of the container; and
    a hood carried by the shell.

7. The apparatus according to claim 6, further comprising means for releasibly fastening the cushion to the shell.

8. The apparatus according to claim 7, wherein the fastening means is a hook and loop fastener.

9. The apparatus according to claim 6, wherein the container includes a press fit lid.

10. The apparatus according to claim 6, wherein the spine comprises:
    an interior bar; and
    an exterior bar telescopically fitting over the interior bar, said exterior bar dimensioned to fit the slots of the base members of the container.

11. The apparatus according to claim 10, wherein the spine has means for releasibly attaching the interior bar to the exterior bar.

12. The pet apparatus according to claim 6, wherein the hood is collapsible.

13. An apparatus, comprising:
    a shell having two holes formed therein;
    a hood carried by the shell including a cover and a frame, wherein the frame includes a gear means for anchoring the hood to the shell and for spreading the hood, the gear means having two posts, the two holes being dimensioned to receive the two posts;
    a container carried by the shell; and
    means for releasibly attaching the container to the shell.

14. The apparatus according to claim 13, wherein the frame includes plural frame members that are rotationally affixed to each other.

15. The apparatus according to claim 13, wherein the frame includes plural frame members, each frame member having a slot, and wherein the gear means includes a gear having plural teeth, each tooth of the plural teeth of the gear dimensioned to fit into the slot of each frame member of the plural frame members.

16. The apparatus according to claim 13, wherein said releasible attaching means includes a detent so that when the detent is pressed, the container can be removed from the shell.

17. An apparatus, comprising:
    a shell;
    a container;
    a spine carried by the shell, the shell foldable along the spine; and
    means for releasibly attaching the container to the spine of the shell, wherein the attaching means includes a detent so that when the detent is pressed, the container can be removed from the shell.

18. An apparatus, comprising:
    a shell;
    a hood carried by the shell including a cover and a frame, wherein the frame includes plural frame members and a gear means for anchoring the hood to the shell and for spreading the hood, each frame member having a slot, the gear means including a gear having plural teeth, each tooth of the plural teeth of the gear dimensioned to fit into the slot of each frame member of the plural frame members; and
    means for releasibly attaching the container to the shell.

* * * * *